Patented June 15, 1926.

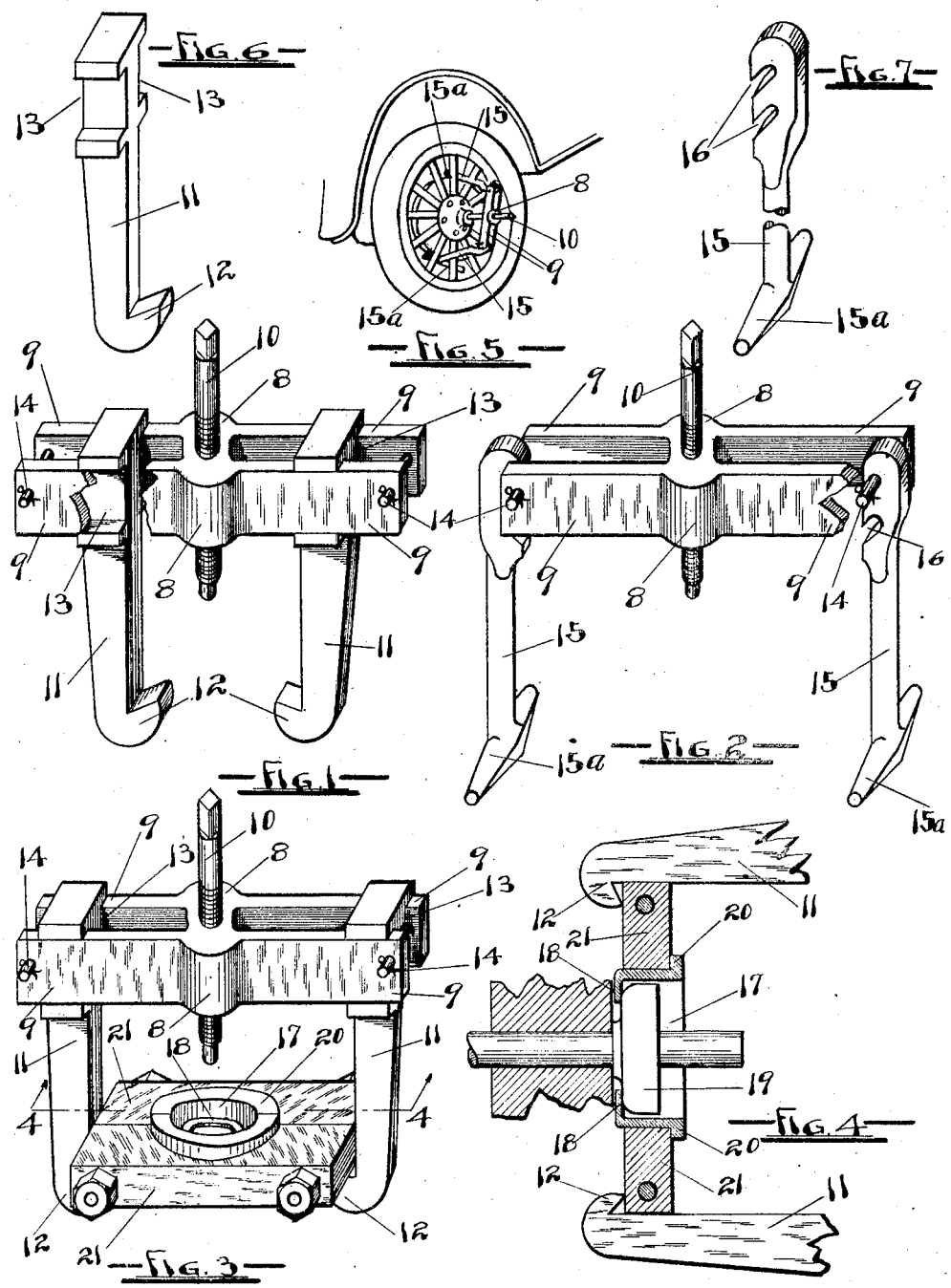

1,589,015

UNITED STATES PATENT OFFICE.

RALPH W. LEE, OF PORTLAND, OREGON, ASSIGNOR TO LELIN MANUFACTURING COMPANY, OF PORTLAND, OREGON.

PULLER.

Application filed January 31, 1923. Serial No. 616,043.

My invention relates to pullers in general, and particularly to pullers adapted to various uses of such a device upon automobiles and like machinery, the object being to provide in a single tool various combinations of elements that will adapt the tool for any use desired in pulling automobile wheels, or gears or bearings.

I accomplish this object by means of the construction illustrated in the accompanying drawing, which is a part of this application for Letters Patent, like characters of reference indicating like parts throughout the several views thereof, and in which:

Fig. 1 is a perspective view of my device adapted for pulling gears and the like.

Fig. 2 is a similar view of the device adapted for pulling wheels.

Fig. 3 is a similar view of the device adapted for pulling bearing sleeves and the like.

Fig. 4 is a section upon line 4—4 of Fig. 3, drawn upon an enlarged scale.

Fig. 5 is a perspective view of my device in use pulling an automobile wheel.

Fig. 6 is a perspective view of one of the gear pulling arms.

Fig. 7 is a perspective view of one of the wheel pulling arms.

In general my device consists of a member having a pressure exerting device mounted thereupon, and also having oppositely extending parallel pairs of arms, and various members adapted for mounting between said parallel arms for various uses, as hereinafter described.

The body member consists of a hub 8 having oppositely extending pairs of parallel arms 9 integral therewith, and a screw 10 threaded through said hub. Mounted between said arms are various members adapted for various uses, the combinations of which with the novel body member compose the invention.

For the purpose of pulling gears and the like I provide my device with a pair of arms 11 having hooked ends 12, and a head with grooves 13 therein adapted to engage the arms 9 of the body member, as shown in Figs. 1 and 3. These arms 11 are inserted in the body member by removing the pins 14 therefrom and sliding the arms 11 upon the arms 9, the slots 13 in said arms 11 engaging their respective arms 9. The heads of the arms 11 with their slots 13 are made a close sliding fit in the arms 9, so that any transverse pressure upon the hooked ends 12 of said arms 11 parallel to the arms 9 will immediately cramp and lock the arms 11 in place upon the arms 9. Thus the arms 11 may be very quickly and conveniently adjusted to any gear or other like device that they are adapted to pull.

To pull automobile wheels I provide T-shaped arms 15 with slots 16 in the heads thereof adapted to engage the pins 14 of the body member, the T headed portion 15$^a$ of said arms 15 being adapted to engage the spokes of the wheel, as shown in Fig. 5.

To pull bearing sleeves and like devices, particularly where such are in close position relatively to shaft shoulders or other structures, I provide a split collar 17 having a thin annular flange 18 adapted to engage the bearing sleeve 19 as shown in Fig. 4, and an annular flange 20 adapted to engage the face of a split block 21, which split block coacts with the arms 11 as shown in Figs. 3 and 4.

The screw 10 is adapted to bear upon the end of the shaft or axle, or other member from which it is desired to pull the part being operated upon.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claim.

Having disclosed my invention so that others may be enabled to construct and to use the same, what I claim as new, and desire to secure by Letters Patent is:

In a puller: a body composed of a hub and extending pairs of respectively parallel arms integral with said hub; a screw threaded through said hub; a pulling arm intermediate each of said pairs of parallel arms, and having slots therein to slidably engage said parallel arms: in combination with a split block adapted to coact with said pulling arms, and having an orifice therethrough; and a split collar having an inwardly projecting flange upon one end thereof, and an outwardly projecting flange upon the opposite end thereof, said latter flange coacting with said blocks to retain the said split collar therein.

In witness whereof I claim the foregoing as my own I hereunto affix my signature at Portland, county of Multnomah, State of Oregon, this 25th day of Jan. 1923.

RALPH W. LEE.